US008345399B2

(12) United States Patent
Risi

(10) Patent No.: US 8,345,399 B2
(45) Date of Patent: Jan. 1, 2013

(54) ELECTRICAL PROTECTION ASSEMBLY AND SYSTEM

(75) Inventor: Philip Edward Lawrence Risi, North West Province (ZA)

(73) Assignee: The Trustees for the Time Being of the Philip Edward Lawrence Risi Trust, North West Province (ZA)

( * ) Notice: Subject to any disclaimer, the term of this patent is extended or adjusted under 35 U.S.C. 154(b) by 249 days.

(21) Appl. No.: 12/895,699

(22) Filed: Sep. 30, 2010

(65) Prior Publication Data

US 2011/0080682 A1 Apr. 7, 2011

(51) Int. Cl.
*H02H 3/22* (2006.01)

(52) U.S. Cl. ........... 361/111; 361/35; 361/117; 361/124

(58) Field of Classification Search ........................ None
See application file for complete search history.

(56) References Cited

U.S. PATENT DOCUMENTS 4,320,432 A * 3/1982 Duenke ........................... 361/39
5,300,914 A * 4/1994 Hartman et al. .............. 337/249

* cited by examiner

*Primary Examiner* — Rexford Barnie
*Assistant Examiner* — Terrence Willoughby
(74) *Attorney, Agent, or Firm* — Duane Morris LLP

(57) ABSTRACT

An electrical protection assembly for connection between an electrical power supply line and electrical equipment has an insulating mounting structure; a first arm connectable to a live conductor for connection to a fusible device at a first end and a voltage surge protection unit at a second end, pivotally attached to the mounting structure in a displaceable manner intermediate its ends; a first connection arrangement at the first end of the first arm for connection to the fusible device; and a second connection arrangement at the second end of the first arm for connection to the voltage surge protection unit. The assembly further includes first and second springs for urging the first arm relative to the mounting structure. The springs may urge the second connection arrangement towards the voltage surge protection unit and the first connection arrangement away from the fusible device.

17 Claims, 1 Drawing Sheet

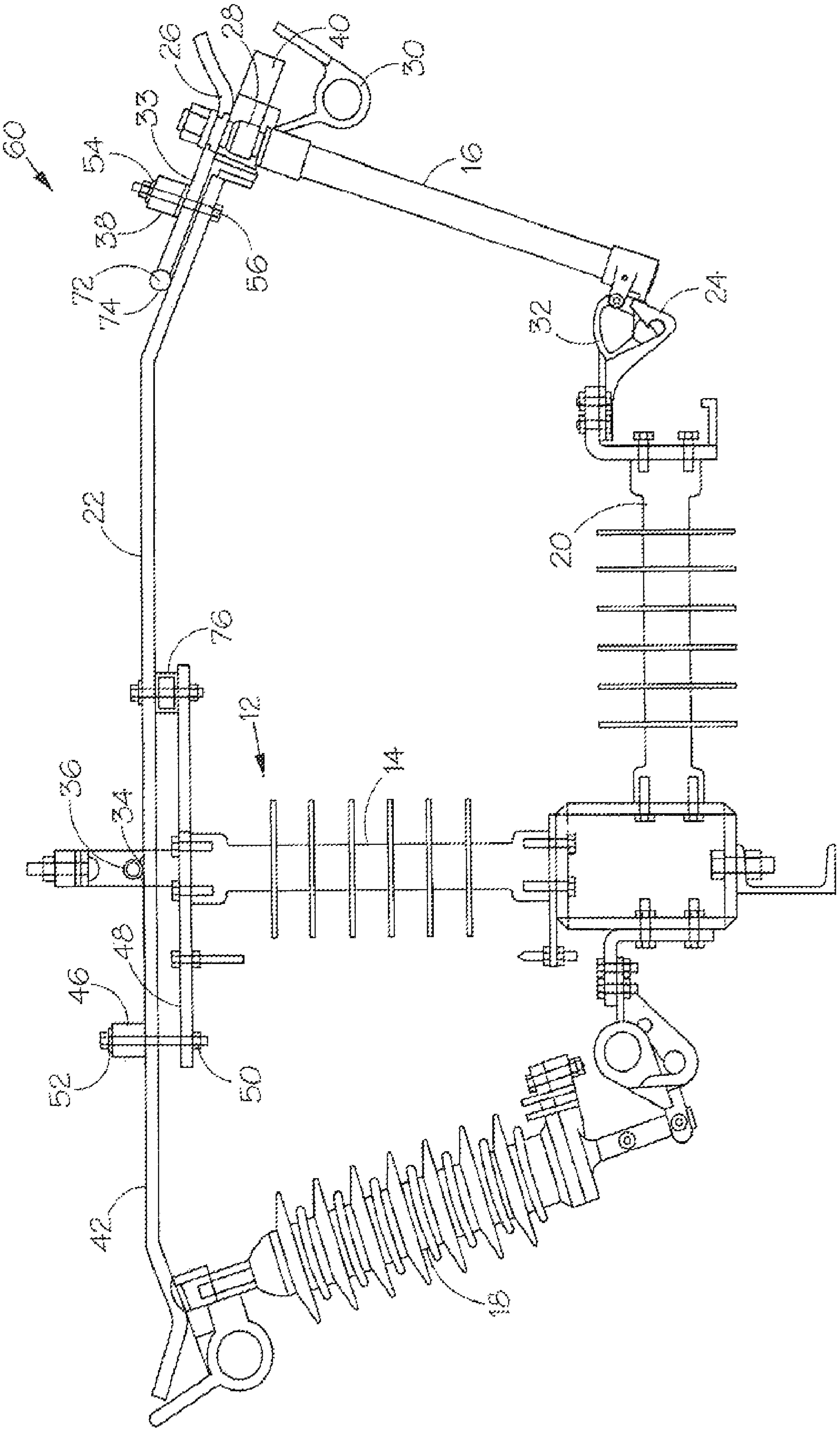
60
54
33
26
28
40
30
16
38
56
72
74
24
32
20
22
76
12
14
36
34
48
46
52
50
42
18

ELECTRICAL PROTECTION ASSEMBLY AND SYSTEM

RELATED APPLICATION

This application is a new United States Application which claims the benefit of priority to provisional South African Application No. 2009/06856 entitled The Distribution of Electricity filed on Oct. 1, 2009, the contents of which are incorporated herein by reference as if set forth in their entirety.

DISCLOSURE

The present invention relates to the distribution of electricity. In particular, the invention relates to an electrical protection assembly for connection between an electrical transmission line and electrical equipment. The invention also relates to an electrical installation which includes the electrical protection assembly.

Provided is an electrical protection assembly for connection between an electrical power supply line and electrical equipment. The electrical protection assembly includes an insulating mounting structure; a first arm connectable to a live conductor for connection to a fusible device at a first end and a voltage surge protection unit at a second end, attached to the mounting structure in a displaceable manner intermediate its ends; a first connection arrangement at the first end of the first arm for connection to the fusible device; and a second connection arrangement at the second end of the first arm for connection to the voltage surge protection unit, characterized thereby that the assembly further includes a first urging element and a second urging element for urging the first arm relative to the mounting structure, with the first urging element being on one side of the mounting structure and the second urging element on the other side of the structure.

The first and second urging elements may both urge the first arm in the same direction. Conveniently the first arm may be pivotally mounted to the mounting structure and the urging elements may both urge the first arm in a clockwise or anticlockwise direction. Preferably, the urging elements both urge the first arm such that, in use, the second connection arrangement is urged towards the voltage surge protection unit and the first connection arrangement is urged away from the fusible device.

It will thus be appreciated by those skilled in the art that, in use, when the surge protection unit fails and is displaced out of engagement with the second connection arrangement, the first arm pivots away from the fusible device, allowing it to be displaced into a visible disengaged position.

The urging elements may be compression springs. The electrical protection assembly may thus further have a support fast with the mounting structure, the springs being engaged therewith, with one spring being directly mounted between the support and the first arm and the other being indirectly mounted there between.

The first connection arrangement may include a hood assembly. The hood assembly may be pivotally connected to the first end of the first arm and may be urged towards the fusible device, in use, by means of a third compression spring. An arcing contact may be provide adjacent the hood assembly.

The electrical protection arrangement may have connectors, spaced from the connection arrangements for connection to ends of the fusible device and the voltage surge protection unit opposite to their ends connected to the first and second connection arrangements, respectively. In conventional manner the fusible device and the voltage protection unit may be pivotally connectable to these connectors.

The first arm may be pivotally secured to the mounting structure about a pivot axis. The pivot axis may then be substantially the same distance from the hood assembly and the connector for the fusible device.

The mounting structure may include a substantially straight main insulator and the hood assembly may be further from it than its associated connector. Thus, in use, if the electrical protection assembly is mounted with the main insulator upright, which is usually the case, and a fusible device engaged between the hood assembly and its associated connector, it will lean over to facilitate pivoting thereof, under gravity, when it fuses.

The fusible device and the voltage surge protection unit may be removable and replaceable. They may be remotely removable and replaceable.

The invention extends further to an electrical installation, such as an installed electrical system, which includes an electrical protection assembly according to the invention.

The invention is now described by way of example with reference to the accompanying diagrammatic drawing, which shows a schematic view of an electrical protection assembly in accordance with the invention.

BRIEF DESCRIPTION OF THE DRAWING

FIG. 1 is a plan view of the layout of an exemplary embodiment of an electrical protection assembly according to the invention.

DESCRIPTION

Referring to the drawing, reference numeral 10 generally indicates of an electrical protection assembly in accordance with an aspect of the invention. The assembly 10 has a central support structure 12 with a main, substantially straight, insulator 14. On one side of the support structure 12 there is a fusible device 16 and on the other a voltage surge protection unit 18.

The fusible device 16 is held between a first upper, displaceable arm 22 and a second lower arm 20 that is spaced from the upper arm 22. The lower arm 20 has a connector 24 at its free end, the lower end of the fusible device 16 being connected thereto, in use, in a pivotal manner, as is known in the art. A hood assembly 26 is attached to a first free end of the upper arm 22 to be displaceable relative thereto. The hood assembly 26 is connectable to the upper end of the fusible device. Thus, the fusible device 16 has a cap 28 at its upper end which engages the hood assembly 26, in use, again in known manner. The fusible device 16 is remotely removable and replaceable, with a suitable tool (not shown), by means of eyes 30 and 32.

The upper arm 20 is directly pivotally mounted on the support structure 12. The hood assembly 26 is mechanically and electrically secured to an outer end of a relatively short, cranked, auxiliary arm 33. An inner end of the auxiliary arm 33 is pivotally attached to the upper arm 22 by means of a bracket 72 and pivot pin 74 such that the hood assembly 26 is movable away from the connector 24 upon fusing of the fusible device 16. The hood assembly 26 further has a forked guide 35 for guiding the cap 28 when it is engaged with the hood arrangement 26. In addition, the electrical protection assembly 10 has a forked arcing contact 40 positioned between the hood assembly 26 and the connector 24, close to the hood assembly 26. It will be appreciated that the guide 35 also performs an arcing function, in use.

A mounting bracket 34 is fast with a central portion of the upper arm 22. The bracket 34 is pivotally mounted to the upper end of the main insulator 14 by a pivot pin 36.

The upper arm 22 extends beyond the bracket 34 and the insulator 14 to have a portion 42 on the opposite side of the insulator 14 to the hood assembly 26, by means of which the voltage surge protection unit 18 is mounted. The portion 42 is urged in an anticlockwise direction by means of a first urging element, in the form of a compression spring 46, acting against a stop washer 52 fast with a support 48 by means of a bolt 50. The spring 46 is positioned on the voltage surge protection unit side and acts on the portion 42 of the upper arm 22. The support 48 extends to the fusible device side of the insulator 14 and carries a second spring 76 that also acts on the upper arm 22 to displace it in an anticlockwise direction together with the spring 46. It will be appreciated that, in use, when the voltage surge protection unit 18 drops out (in known manner), the upper arm 22 is caused to pivot to release the fusible device 16 and allow it to drop out as well.

It will be appreciated further that when the voltage surge protection unit 18 is engaged with the portion 42 the upper arm 22 is effectively fixed in position and the auxiliary arm 33 then moves independently relative thereto. However, when the voltage surge protection unit 18 drops out, the auxiliary arm 33 and the upper arm 22 then move together under the action of the springs 46 and 76.

A further urging element, in the form of a compression spring 54, is provided for urging the hood assembly 26 towards the connector 24. The spring 38 acts on a stop washer 54 secured to the upper arm 22 by a bolt 56. It will be seen that the spring 38 urges the auxiliary arm 33 in a clockwise direction.

It will be seen further that the hood assembly 26 and the connector 24 are substantially equidistant from the pivot pin 36. Further, the auxiliary arm 33 is configured such that the hood assembly 26 is disposed substantially transversely to the fusible device 16, such that, when the fusible device fuses, in use, a perpendicular thrust is exerted on the hood assembly 26. As shown, the hood assembly 26 is further from the main insulator 14 than the connector 24. Thus if the main insulator 14 is vertically mounted, which is normally the case, the fusible device 16 is outwardly angled. Thus, in use, upon fusing of the fusible device 16, it pivots in a clockwise direction, in known manner, about the connector 24.

The arcing contact 40 straddles the fusible device 16 and, in use, upon fusing of the fusible device 16, as the hood assembly 26 moves away together with the arcing contact 40 and the fusible device 16 pivots away, an arc is drawn between the cap 28 and the arcing contact 40.

By means of the invention a balanced force is exerted on the upper arm 22.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid in understanding the principles of the invention and the concepts contributed to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An electrical protection assembly for connection between an electrical power supply line and electrical equipment, comprising:

an insulating mounting structure;

a first arm connectable to a live conductor for connection to a fusible device at a first end and a voltage surge protection unit at a second end, attached to the mounting structure in a displaceable manner intermediate its ends;

a first connection arrangement at the first end of the first arm for connection to the fusible device; and a second connection arrangement at the second end of the first arm for connection to the voltage surge protection unit, wherein the assembly further includes a first urging element and a second urging element for urging the first arm relative to the mounting structure, with the first urging element being on one side of the mounting structure and the second urging element on the other side of the structure.

2. The electrical protection assembly as in claim 1, in which the first and second urging elements both urge the first arm in the same direction.

3. The electrical protection assembly in claim 2, in which the first arm is pivotally mounted to the mounting structure and the urging elements both urge the first arm in a clockwise or anti-clockwise direction.

4. The electrical protection assembly as in claim 3, in which the urging elements both urge the first arm such that, in use, the second connection arrangement is urged towards the voltage surge protection unit and the first connection arrangement is urged away from the fusible device.

5. The electrical protection assembly as in claim 4, in which the urging elements are compression springs.

6. The electrical protection assembly as in claim 5, further comprising a support fast with the mounting structure, the compression springs being engaged therewith, with one said compression spring being directly mounted between the support and the first arm and the other said compression spring being indirectly mounted therebetween.

7. An electrical system disposed between an electrical power supply line and electrical equipment, comprising the electrical protection assembly, as in claim 6.

8. The electrical protection assembly as in claim 1, in which the first connection arrangement includes a hood assembly.

9. The electrical protection assembly as in claim 8, in which the hood assembly is pivotally connected to the first end of the first arm and is urged towards the fusible device, in use, by means of a third urging element.

10. The electrical protection assembly as in claim 9, further comprising an arcing contact adjacent the hood assembly.

11. The electrical protection assembly as in claim 8, in which the first arm is pivotally secured to the mounting structure about a pivot axis and the pivot axis is substantially the same distance from the hood assembly and the connector for the fusible device.

12. The electrical protection assembly as in claim 11, in which the mounting structure includes a substantially straight main insulator and the hood assembly is further from it than its associated connector.

13. An electrical system disposed between an electrical power supply line and electrical equipment, comprising the electrical protection assembly, as in claim 11.

14. The electrical protection assembly as in claim 1, further comprising connectors, spaced from the connection arrangements for connection to ends of the fusible device and the voltage surge protection unit opposite to their ends connected to the first and second connection arrangements, respectively.

15. The electrical protection assembly as in claim 14, in which the fusible device and the voltage protection unit are pivotally connectable to the connectors.

16. The electrical protection assembly as in claim 1, in which the first and second connection arrangements are such that, in use, the fusible device and the voltage surge protection unit are remotely removable and replaceable.

17. An electrical system disposed between an electrical power supply line and electrical equipment, comprising the electrical protection assembly, as in claim 1.

* * * * *